(No Model.)
J. GUTMANN.
HORSESHOE WITH AUXILIARY FLANGES.
No. 491,643. Patented Feb. 14, 1893.
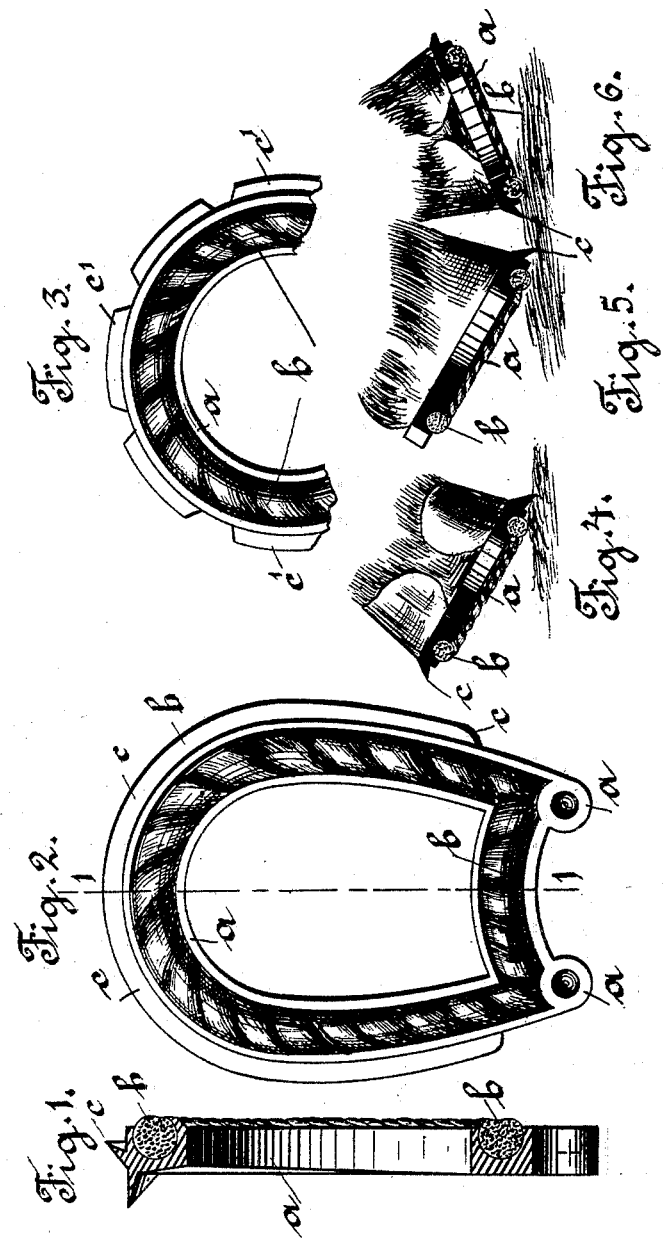
WITNESSES:
Cyrile E. Berthoud.
Thomas M. Smith.
INVENTOR,
Julius Gutmann.
By J. Walter Douglass.
ATT'Y.

UNITED STATES PATENT OFFICE.

JULIUS GUTMANN, OF BERLIN, GERMANY.

HORSESHOE WITH AUXILIARY FLANGES.

SPECIFICATION forming part of Letters Patent No. 491,643, dated February 14, 1893.

Application filed July 23, 1892. Serial No. 441,052. (No model.)

*To all whom it may concern:*

Be it known that I, JULIUS GUTMANN, a subject of the Emperor of Germany, residing at Berlin, in the Kingdom of Prussia and German Empire, have invented certain new and useful Improvements in Horseshoes, of which the following is a specification.

It is well known that horses and mules in starting a heavy load or under other conditions of difficulty are exceedingly apt to lose their foot-hold and fall, because in their efforts their hoofs naturally become inclined to the surface of the pavement, roadway or ground, and consequently slip thereon.

The principal object of my invention is to obviate the above mentioned source of difficulty and danger and to provide a horseshoe with simple, durable and efficient means for preventing the animal from slipping when its hoofs are tilted or inclined at an unusual angle with the ground, pavement or roadway.

In my invention use is made of an auxiliary support, intermediate of the top or hoof surface and the tread, and adapted to engage the ground, pavement or roadway only when the tread of the shoe occupies an unusual angle in respect to the same. This auxiliary support may be limited to the toe portion of the shoe or it may be extended around the whole or any portion of the outer rim of the shoe. Moreover, a shoe provided with an auxiliary support embodying features of my invention may also be provided with pads or packing or with other attachments.

The nature, characteristic features and scope of my invention will be more fully understood from the following description taken in connection with the accompanying drawings forming part hereof; and in which Figure 1 is a transverse section taken on the line 1—1 of Fig. 2, and illustrating a horseshoe embodying features of my invention. Fig. 2 is a plan view of the underside of a horseshoe embodying features of my invention. Fig. 3 is a similar view of a part of a horseshoe embodying a modification of my invention. Fig. 4 is a diagrammatic view illustrating the action of the auxiliary support when the hoof is inclined or tilted toward the right hand. Fig. 5 is a similar view illustrating the action of the auxiliary support when the hoof is inclined or tilted forward; and Fig. 6 is a similar view illustrating the action of the auxiliary support when the hoof is tilted toward the left hand.

In the drawings $a$ is a horseshoe of any required pattern or shape, the corresponding edges of its tread surface and its top surface being in alignment. In the present instance this shoe is of the type commonly designated as "round" or "bar" shoes, and is provided upon the tread portion thereof with a recess or groove adapted for the reception of a packing $b$, of tarred rope, india rubber, or other preferred material. $c$ is the auxiliary support, which may be continuous and limited to the toe portion of the shoe or it may be extended around the sides and toe as shown in Fig. 2. If preferred, this support may be made in sections $c'$, disposed around the rim of the shoe as shown in Fig. 3. In the present instance this auxiliary support comprises an annular flange projecting from the edge or annular flange projecting from the edge or rim of the shoe and located above the tread thereof, so that it clears or escapes the ground, roadway or pavement at the ordinary paces of the animal, but comes into contact therewith when the animal is making unusual efforts and consequently tilts or inclines its hoofs.

For ordinary purposes and when the animal does not naturally or necessarily tread sidewise, the auxiliary support $c$, is limited to the toe portions of the shoe. In such case the mode of operation of the auxiliary support $c$, is as follows:—The animal when performing its normal paces presents its hoofs to the ground, pavement, or roadway in such manner that the tread of the shoe, or in the present instance the packing $b$, contacts therewith. However, when the animal is making unusual efforts, as in starting a heavy load, it presents its hoofs to the ground, pavement, or roadway at an inclination therewith, as shown in Fig. 5, so that the support $c$ is brought into action and by engaging the ground, roadway, or pavement prevents the animal from slipping.

Whenever the animal naturally or of necessity treads sidewise, as in turning two wheeled carts and the like, the auxiliary support is extended around the toe and side portions of the shoe. In such case the action of the toe portion of the support $c$, is as above explained with reference to Fig. 5. The side portions of the auxiliary support c, clear the ground, pavement or roadway when the animal is performing its normal paces, but are brought into action when the hoofs of the animal are inclined sidewise as shown in Figs. 4 and 6, and by engaging the ground, roadway or pavement prevent the animal from slipping.

It may be remarked that the packing b, and auxiliary support c, may be advantageously employed upon the same shoe, because the packing constitutes a cushion that breaks the force of the impact of the shoe upon the ground, roadway or pavement, and the auxiliary support comes into action at a time when the packing is most apt to slip and thus prevents the animal from losing its foot-hold. However, it must be borne in mind that my invention is not limited to the employment of the packing, but

Having thus described the nature and objects of my invention, what I claim as new and desire to secure by Letters Patent is:—

1. A horseshoe having the corresponding outside edges of its tread and top surface in alignment, and having an auxiliary support projecting from its outside rim and located intermediate of the top surface and tread, substantially as and for the purposes set forth.

2. A horseshoe having the corresponding outside edges of its tread and top surface in alignment, and having a continuous flange projecting laterally from its outside rim and disposed above its tread in position for engaging the ground when the shoe is tilted, substantially as and for the purposes set forth.

3. A horseshoe having the corresponding outside edges of its tread and top surface in alignment, and having a continuous flange projecting laterally from its outside rim and disposed above its tread, and having a packing applied to its tread, substantially as and for the purposes set forth.

In witness whereof I have hereunto set my hand in presence of two witnesses.

JULIUS GUTMANN.

Witnesses:
W. H. EDWARDS,
W. HAUPT.